(12) United States Patent
Siu

(10) Patent No.: US 6,246,687 B1
(45) Date of Patent: Jun. 12, 2001

(54) NETWORK SWITCHING SYSTEM SUPPORTING GUARANTEED DATA RATES

(75) Inventor: Kai-Yeung S. Siu, Charlestown, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/049,429

(22) Filed: Mar. 27, 1998

Related U.S. Application Data

(60) Provisional application No. 60/041,626, filed on Mar. 27, 1997.

(51) Int. Cl.[7] .................................................. H04L 12/56
(52) U.S. Cl. ........................... 370/395; 370/412; 370/429
(58) Field of Search ................................... 370/230, 231, 370/235, 252, 253, 395, 412, 413, 414, 415, 416, 417, 418, 428, 429, 468

(56) References Cited

U.S. PATENT DOCUMENTS

| | | | |
|---|---|---|---|
| 5,392,280 | * | 2/1995 | Zheng .................................... 370/412 |
| 5,664,116 | | 9/1997 | Gaytan et al. .................... 395/200.64 |
| 5,748,629 | * | 5/1998 | Caldara et al. ....................... 370/389 |
| 5,787,086 | * | 7/1998 | McClure et al. ..................... 370/413 |
| 5,867,663 | * | 2/1999 | McClure et al. ................. 395/200.64 |
| 6,034,945 | * | 3/2000 | Hughes et al. ........................ 370/230 |

* cited by examiner

Primary Examiner—Ricky Ngo
(74) Attorney, Agent, or Firm—Hamilton, Brook, Smith & Reynolds, P.C.

(57) ABSTRACT

In a cell switching network, a method of buffering cells in a switch assigns guaranteed buffer space per time interval T to individual virtual connections (VCs). In each of successive periods of time, the individual VCs are allocated available buffer space up to their guaranteed buffer space. After the VCs are served their guaranteed data rates, and within the remaining time of each period, excess buffer space is allocated to individual VCs. In a preferred embodiment, cells are stored in a shared first-in-first-out (FIFO) buffer which serves plural VCs. A cell count is maintained for each VC, and is incremented for each corresponding incoming cell. Cell counts are decremented according to a round robin scheme, no lower than some negative limit, independent of the actual VC with which the outgoing cell is associated, allowing the VC to make up some bandwidth later for an earlier period of non-use. When a cell count for some virtual connection is above a connection threshold, incoming cells associated with the virtual connection are blocked from storage in the buffer. In an alternate embodiment, cells are buffered in queues where there is one queue per VC.

38 Claims, 3 Drawing Sheets

NETWORK SWITCHING SYSTEM SUPPORTING GUARANTEED DATA RATES

RELATED APPLICATION(S)

This application claims the benefit of U.S. Provisional Application No. 60/041,626, filed Mar. 27, 1997, the entire teachings of which are incorporated herein by reference.

GOVERNMENT SUPPORT

The invention was supported, in whole or in part, by a grant MIP-9357553 from National Science Foundation. The Government has certain rights in the invention.

BACKGROUND OF THE INVENTION

While Asynchronous Transfer Mode (ATM) was originally conceived as a carrier of integrated traffic, recent momentum for the rapid standardization of the technology has come from data networking applications. Since most data applications cannot predict their own bandwidth requirements, they usually require a service that allows all competing active virtual connections (VCs) to dynamically share the available bandwidth. The unspecified bit rate (UBR) and the available bit rate (ABR) service classes in ATM have been developed specifically to support data applications.

The UBR service is designed for those data applications that want to use any available bandwidth and are not sensitive to cell loss or delay. Such connections are not rejected on the basis of bandwidth shortage and are not policed for their usage behavior. During congestion, cells may be lost but the sources are not expected to reduce their cell rates. Instead, these applications may have their own higher-level loss recovery and retransmission mechanisms, such as the window flow control employed by transmission control protocol (TCP). The advantage of using UBR service for data transport is its simplicity and a minimal interaction required between users and the ATM network.

The ABR service has been developed with the goal of minimizing switch buffer requirements and cell loss in transporting data, and allowing users to have fair access to the available bandwidth. To achieve such service requirements, the ABR service uses congestion control at the ATM layer. It requires network switches to constantly monitor the traffic load and feed the information back to the sources. The sources are expected to adjust their input to the network dynamically based on the congestion status of the network. Thus, the benefits of ABR over UBR come at the expense of increased complexity in switches and end systems. Moreover, ABR also requires a certain level of interoperability among network switches.

In fact, there has been a continuing debate in the networking community about the need for ABR service. A major argument against ABR is that while ABR assumes that the end systems comply with the ABR source behavior, most current applications are only connected to ATM via legacy networks such as Ethernet. Therefore, ABR may only push congestion to the ATM network edges and cannot provide flow control on an end-to-end basis.

Furthermore, most users today are typically either not able to specify the range of traffic parameters needed to request most ATM services, or are not equipped to comply with the source behavior rules required by existing ATM services. As a result, there are many existing users for whom the benefits of ATM service guarantees remain unattainable. Those users access ATM networks mostly through UBR connections, which provide no service guarantees. In view of this, R. Guerin and J. Heinanen, "UBR+ Serve Category Definition", ATM Forum Contribution 96-1598, December 1996, have proposed a new service, is originally named UBR+ but now called Generic Frame Rate or GFR, which will provide users with some level of service guarantees yet require minimal interaction between users and ATM networks.

The GFR service specifies that a user should be provided with a minimum service rate guarantee and with fair access to any excess available bandwidth. In other words, the GFR service will guarantee to a user a minimum throughput when the network is congested, while allowing a user to send at a higher rate when additional bandwidth is available.

U.S. Pat. No. 4,769,810 ("Packet Switching System Arranged for Congestion Control Through Bandwidth Management") and U.S. Pat. No. 4,769,811 ("Packet Switching System Arranged for Congestion Control"), both to Eckberg, Jr., et al., describe several algorithms which attempt to provide comparable service by "marking" certain packets.

Upon arrival of a packet at a network boundary, a counter corresponding to a virtual connection is incremented by the number of bytes in the packet plus a fixed amount k. The counter is decremented by another fixed amount c at regular time intervals. If the counter exceeds some moving threshold, the packet is marked for possible discard at some other node, although marked packets are not necessarily discarded. If a node becomes congested, marked packets are dropped by the node.

SUMMARY OF THE INVENTION

In accordance with the present invention, guaranteed data rates are served in a cell switching network without the need for monitoring data rates or marking packets. To buffer cells in a switch, guaranteed buffer space per time interval T is assigned to individual virtual connections (VCs). In each of successive periods of time, the individual VCs are allocated available buffer space up to their guaranteed buffer space. After the connections are served their guaranteed buffer space, and within the remaining time of each period, excess buffer space is allocated to individual VCs.

In a preferred embodiment, cells are stored in at least one first-in-first-out (FIFO) buffer which serves plural virtual connections. For each incoming cell stored in the buffer, a corresponding virtual connection is identified and a cell count for that virtual connection is incremented. For each outgoing cell, a virtual connection cell count is decremented independent of the actual virtual connection with which the outgoing cell is associated.

Preferably, in each time period, each cell count is decremented first by a weight related to the associated guaranteed buffer space of the virtual connection and then according to a fairness algorithm, which in one embodiment decrements cell counts on a round robin basis.

In a preferred embodiment, when the buffer is filled to a fill threshold, and a cell count for some virtual connection is above a connection threshold, incoming cells associated with the virtual connection are blocked from storage in the buffer.

Individual virtual connection cell counts can be decremented to negative values. By allowing negative values, more data can be accepted for a virtual connection which has not been accessed for some time. This allows the VC to make up some bandwidth later for an earlier period of non-use. The cell counts have associated negative limits beyond which the cell counts cannot be decremented.

In an alternate embodiment, cells are buffered in queues where there is one queue per virtual connection, and buffer space is allocated by transferring data from a queue in order to free buffer space in the queue.

For optimal results, the techniques of the present invention are applied at every switch throughout the network. However, improved performance over the prior art is still obtained even where the present invention is not implemented in each switch.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
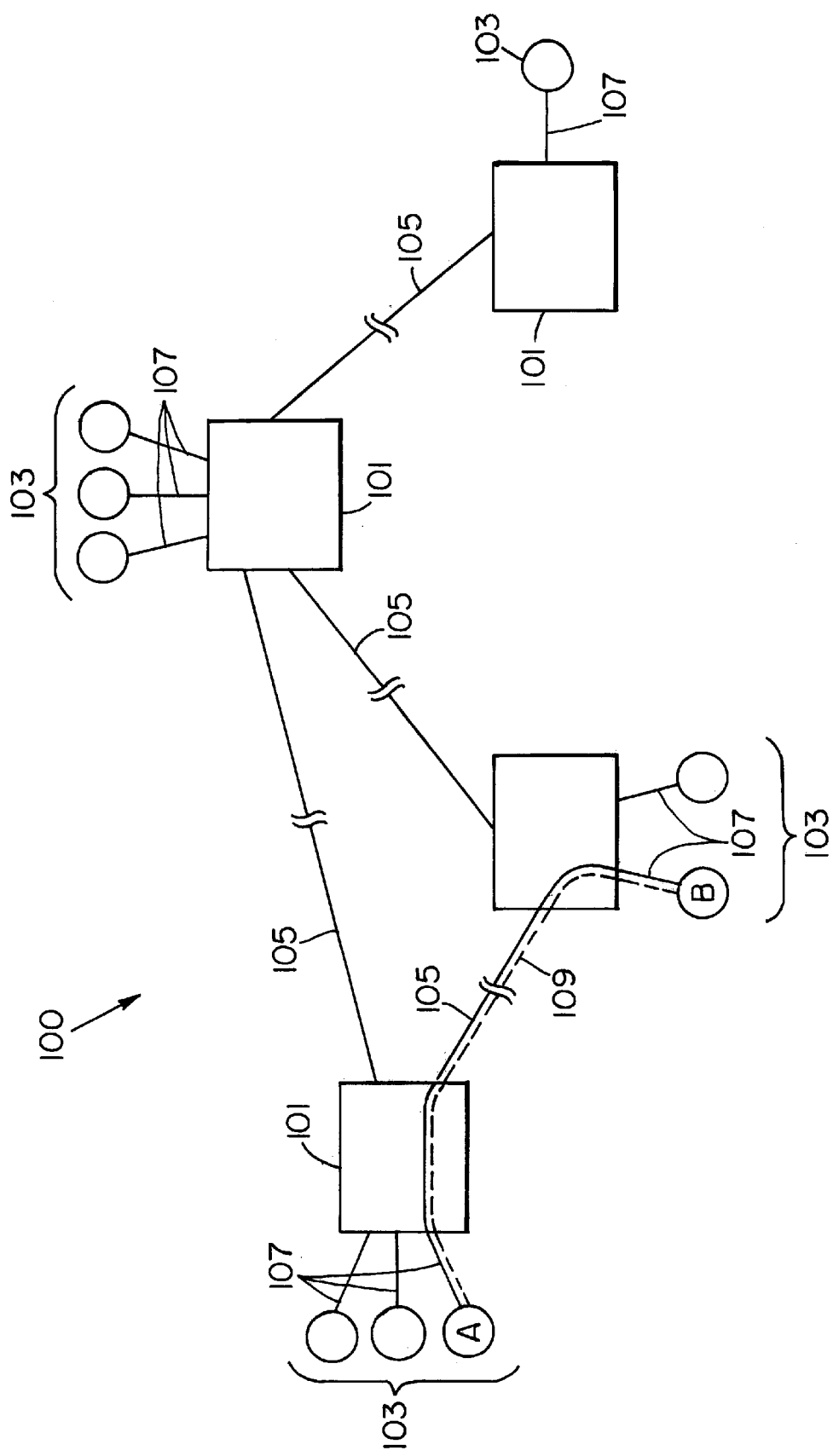
FIG. 1 is a block diagram of an ATM network.

FIG. 1 is a block diagram of a representative ATM network 100. Four ATM switches 101 are interconnected over links 105. Each ATM switch 101 is connected to a number of host computers 103 via TCP or UDP links 107, for example. The host computers 103 will typically be further connected to other hosts over local area networks (LAN) using TCP (not shown). When a communication path needs to be established between two hosts such as hosts A and B, a VC 109 is created by configuring the routing within the ATM switches 101. Note that a single link 105 can carry many VCs 109 simultaneously.

In ATM networks, data traffic supported by GFR is usually mixed with other higher priority constant bit rate (CBR) and variable bit rate (VBR) traffic. Consequently, the available bandwidth B allocated to GFR connections will vary dynamically. Since GFR guarantees each connection a minimum cell rate (MCR), it is assumed that before admitting a connection, the network uses some admission control and bandwidth reservation procedure to ensure that the available bandwidth B (in cells/sec) is always greater than or equal to the sum of the MCRs of every VC, i.e., $$B \geq \sum_{i=1}^{N} MCR_i,$$

where $MCR_i$ (in cells/sec) is the minimum cell rate of $VC_i$, and N is the number of GFR connections.

Figure 2:
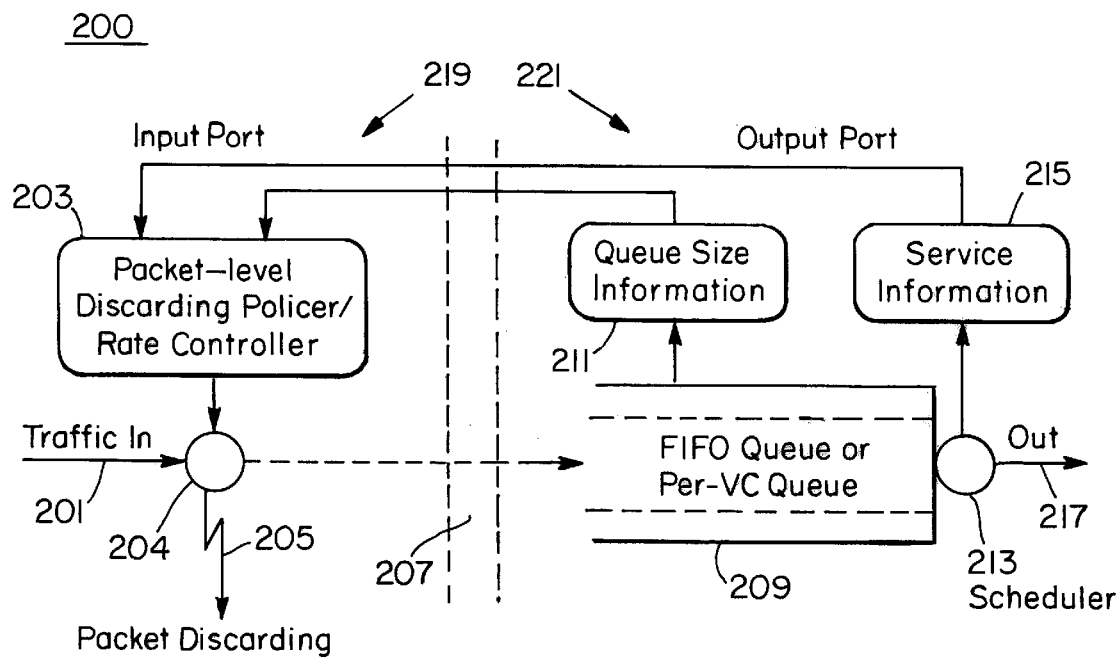
FIG. 2 is a schematic illustrating the general switch architecture used to support GFR service in the present invention.

FIG. 2 illustrates the general switch architecture 200 used to support the GFR service. Traffic 201 enters at an input port 219. A packet-level discarding policer/rate controller 203 implements a policy such as Early Packet Discard (EPD), discussed below, to discard cells belonging to selected packets 205. Gate 204 passes cells which are not discarded to the switching fabric 207 which routes them to a FIFO queue or per-VC queue 209 at an output port 221. Queue size information 211 is sent back to the packet-level discarding policer 203. A scheduler 213 determines when to send out a cell 217, thereby freeing buffer space and allocating that buffer space for future use. In addition, the scheduler generates service information 215 which is also sent back to the packet-level discarding policer 203.

Figure 3:
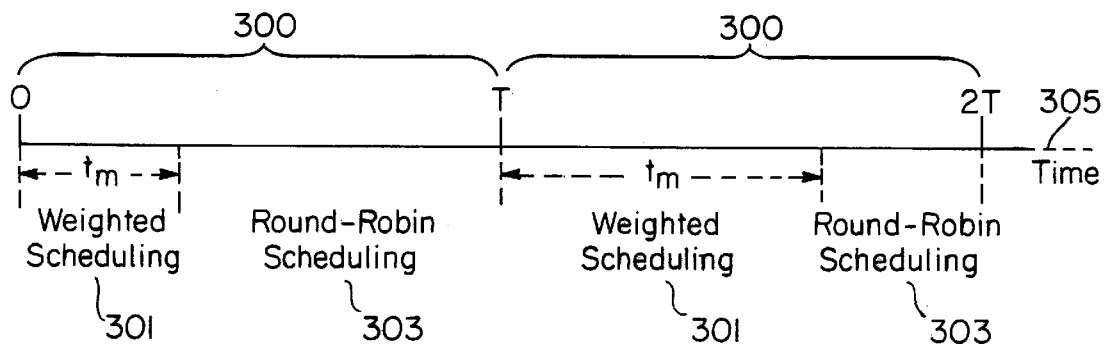
FIG. 3 is a timing diagram for the present invention.

In FIG. 3, the time axis 305 is divided into consecutive time periods 300 of arbitrary length T, such that $T \times MCR_i \geq 1$ for each $VC_i$. The scheduling mechanism consists of two phases in each period T. In the first phase 301, the scheduler serves, or allocates, $T \times MCR_i$ cells for each $VC_i$. In other words, the number of cells to be erved during the first phase 301 of each period T 300 is $$T \times \sum_{i=1}^{N} MCR_i.$$

Since the available bandwidth is $$B \geq \sum_{i=1}^{N} MCR_i,$$

the total number of cells that can be served and for which buffer space can be allocated during a period T is $T \times B \geq$ $$T \times \sum_{i=1}^{N} MCR_i.$$

Thus, after the first phase 301 is complete, there are $$E = T \times \left( B - \sum_{i=1}^{N} MCR_i \right)$$

cells to be served within each period T. These E cells correspond to those cells that can be served whenever there are cells remaining in the queue or buffer after serving each $VC_i$ its minimum guaranteed number of cells over the period T, i.e. $T \times MCR_i$.

In FIG. 3, $t_m$ denotes the time it takes to serve the minimum guaranteed traffic of all VCs within each period T. Because higher priority services are sharing the bandwidth, the available bandwidth B for the GFR connections is constantly varying, so the time $t_m$ varies from one period T to the next. But it is always true that $t_m < T$ because $$\sum_{i=1}^{N} MCR_i \leq B.$$

In the second phase 303 of each period T, the scheduler 213 (FIG. 2) serves each VC in a round robin fashion to achieve fair allocation of the remaining buffer space.

Figure 4:
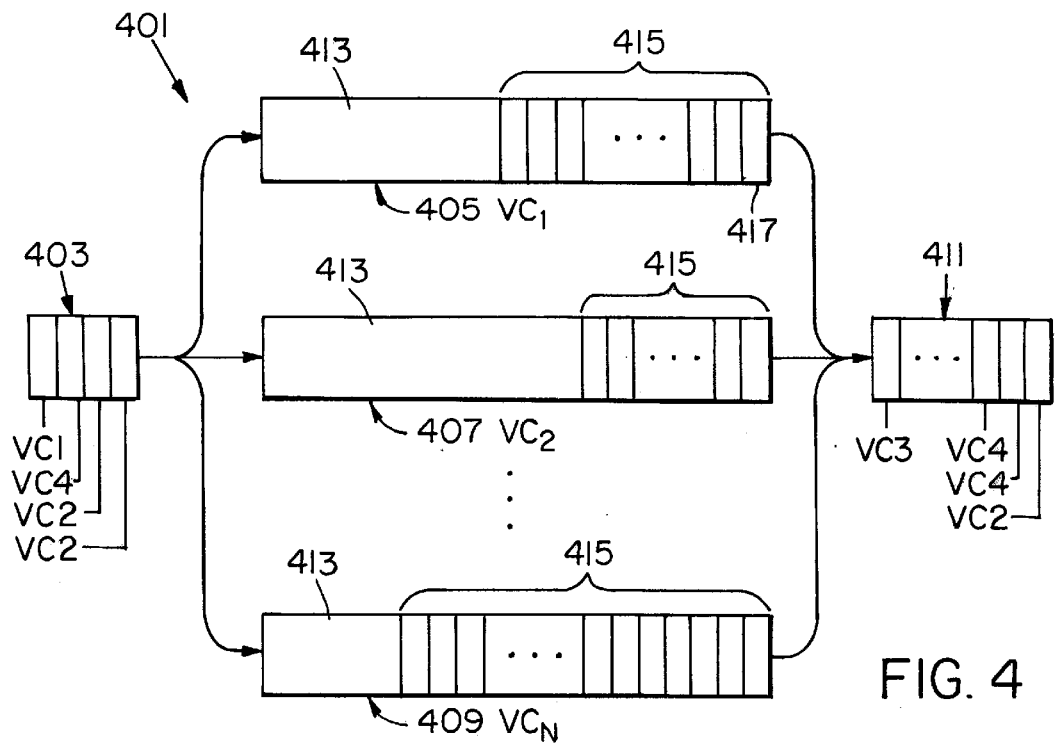
FIG. 4 is a block diagram of a per-VC queuing embodiment of the present invention.

The following pseudocode describes this basic scheduling mechanism:

Step 1: Start from t=0
    For i=1, 2, . . . , N
    MCR Scheduling:
    serve/allocate $MCR_i \times T$ cells of $VC_i$
While time t<T
    Round-Robin Scheduling:

serve/allocate each VC in a round robin fashion
    When time t=T
        go to Step 1
Scheduling Based On Per-VC Oueuing FIG. 4 is a block diagram of a per-VC queuing embodiment 401 of the present invention. A separate queue 405, 407, 409 is allocated for each virtual connection. At any given time, a portion 415 of each queue has been allocated to cells 417 which have previously arrived but have not yet been served. The remaining portion of each queue 413 is free and allocated to receive incoming cells 403. Incoming cells 403 are routed to their proper queue, e.g., queue 405 corresponding to virtual connection $VC_1$, provided that free buffer space has been allocated. Outgoing cells 411 are served from the queues according to some algorithm such as Algorithms 1 or 2 below.

In each of the algorithms below, a weight $W_i$ with initial value 0 is maintained for each $VC_i$, whose $MCR_i$ (in cells/sec) is given. As discussed above, a time period T (in sec) is chosen such that $MCR_i \times T \geq 1$ for each i. Note that $MCR_i \times T$ need not be an integer.

The following pseudocode illustrates a per-VC queuing embodiment of the MCR scheduling phase 301:
Algorithm 1:
    For j=1, 2, . . . , N
        $W_j = W_j + (MCR_i \times T)$
    For j=1, 2, . . . , N
        While $W_j \geq 1$ AND the queue of $VC_j$ is non-empty
            serve one cell of $VC_j$
            $W_j = W_j - 1$
End of MCR Scheduling At the beginning of each time period T, each weight $W_j$ is incremented by $MCR_j \times T$, corresponding to the number of cells which must be served and for which buffer space must be allocated within each period T to guarantee the $MCR_j$ of virtual connection $VC_j$.

Next, the minimum guaranteed traffic of one VC after the other within each period T is served. Cells are served from one connection, e.g., $VC_1$, the corresponding weight $W_1$ being decremented by one each time a cell is served. The serving of cells from $VC_1$ continues until either $W_1$ falls to 0 because the guaranteed $MCR_1$ has been met for this period T, or until $VC_1$'s queue is empty, i.e., there are no more cells to be served for $VC_1$. Note that each time a cell is served, the buffer space it occupied is re-allocated to an incoming cell.

The process repeats for $VC_2$, $VC_3$, etc. until all connections have been serviced such that the guaranteed MCR for each connection has been met.

Alternatively, the traffic can be distributed more evenly by serving the minimum guaranteed traffic of each VC in a round-robin fashion, as the following pseudocode illustrates:
Algorithm 2:
    For j=1, 2, . . . , N
        $W_j = W_j + (MCR_i \times T)$
    While $W_i \geq 1$ for at least some $VC_i$ whose queue is non-empty
        If $W_j \geq 1$ AND the queue of $VC_j$ is non-empty
            serve one cell of $VC_j$
        go to the next VC
End of MCR Scheduling The above MCR scheduling algorithms require that any VC can be served at any time, and thus they rely heavily on the use of per-VC queuing. As discussed below, a virtual queuing embodiment approximates this scheduling algorithm with the use of a shared FIFO queue.

The UBR and GFR services do not specify any congestion control mechanism at the ATM layer. When traffic such as TCP or User Datagram Protocol (UDP) is transported over UBR or GFR, cells are simply discarded when there is a buffer shortage during network congestion. Since each discarded cell is likely to belong to a different packet, a significant number of transmitted packets may have already been corrupted by cell loss and thus need to be retransmitted, resulting in a substantial waste of bandwidth and degradation of throughput.

To address this problem, sophisticated frame discarding mechanisms such as the early packet discard (EPD) algorithm for UBR service have been proposed. The basic idea of EPD is to discard an entire packet prior to buffer overflow, so that the bandwidth is only utilized for the transmission of noncorrupted packets.

One benefit of per-VC queuing is that it provides fairness of packet-based traffic over UBR/GFR with EPD. By controlling the buffer allocation for each VC, EPD effectively controls the throughput of each VC. In particular, when the total queue occupancy exceeds the EPD threshold, an incoming packet is discarded if it belongs to a VC whose queue length is greater than or equal to its fair share of the buffer, e.g., the average queue length. In other words, the first cell of a packet belonging to $VC_j$ with queue length $Q_j$ is discarded if: 1) the current total queue length $Q \geq Th$, and 2) $Q_j \geq Th_j$ where $Th_j$ is set to a value such as Th/N or Q/N where N is the number of active VCs that have cells in the buffer.

Per-VC queuing provides fairness because cells are only discarded from connections that have used more resources than their fair share. This is clearly better than discarding the cells randomly as with simple EPD. Moreover, by buffering the cells of each VC in a separate queue, cell transmission for each VC can be scheduled in a round-robin fashion.

Scheduling Based on Virtual Oueuing An alternate embodiment employs only first-in first-out (FIFO) queuing instead of per-VC queuing, and admits simple implementation in ATM switches. The method is derived from a simple weighted round robin scheduling mechanism which uses per-VC queuing and which can support GFR. Virtual queuing is applied to emulate this scheduling mechanism on a shared FIFO queue.

Virtual queuing is described generally in "Performance of TCP over UBR In ATM with EPD and Virtual Queuing Techniques", Tzeng and Siu, P roceedings of Workshop on Transport Layer Protocols over High Speed Networks, IEEE Globecom, November 1996 and "Improved Virtual Queuing and EPD Techniques for TCP over ATM Technical Report", Wu, Siu, and Ren, d'Arbeloff Laboratory for Information Systems and Technology, Massachusetts Institute of Technology, January 1997, which are incorporated herein by reference.

The essential idea behind GFR is that by monitoring the rate of each connection at the ingress of an ATM network and tagging an appropriate proportion of the cells when the rate exceeds the negotiated rate, each connection can be provided with a minimum bandwidth guarantee. However, this method, when implemented in switches having only FIFO queues, cannot provide each connection with a fair share of the excess available bandwidth. In fact, it has been suggested in "GFR Service Category Def inition" that per-VC queuing may be necessary for supporting GFR service.

However, the current embodiment provides an efficient solution for supporting GFR service and is implemented in ATM switches by using virtual queuing and a shared FIFO queue to provide users with fair access to the excess available bandwidth in addition to the minimum service rate guarantee. Moreover, the need to monitor the rate of each connection at the ingress of an ATM network is eliminated.

The virtual queuing technique was first proposed in "Virtual Queuing Techniques for ABR Service: Improving ABR/VBR Interaction", Chiussi, Xia and Kumar, Infocom '97, to improve rate allocations for ABR connections in the presence of VBR traffic. This technique is applied in the "Performance of TCP over UBR in ATM . . . " paper cited above to emulate the round robin service of per-VC queuing on a FIFO queue for improving the performance of TCP over ATM. Simulation results show that when combined with EPD techniques, virtual queuing can provide significant improvement of fairness among TCP connections.

Figure 5:
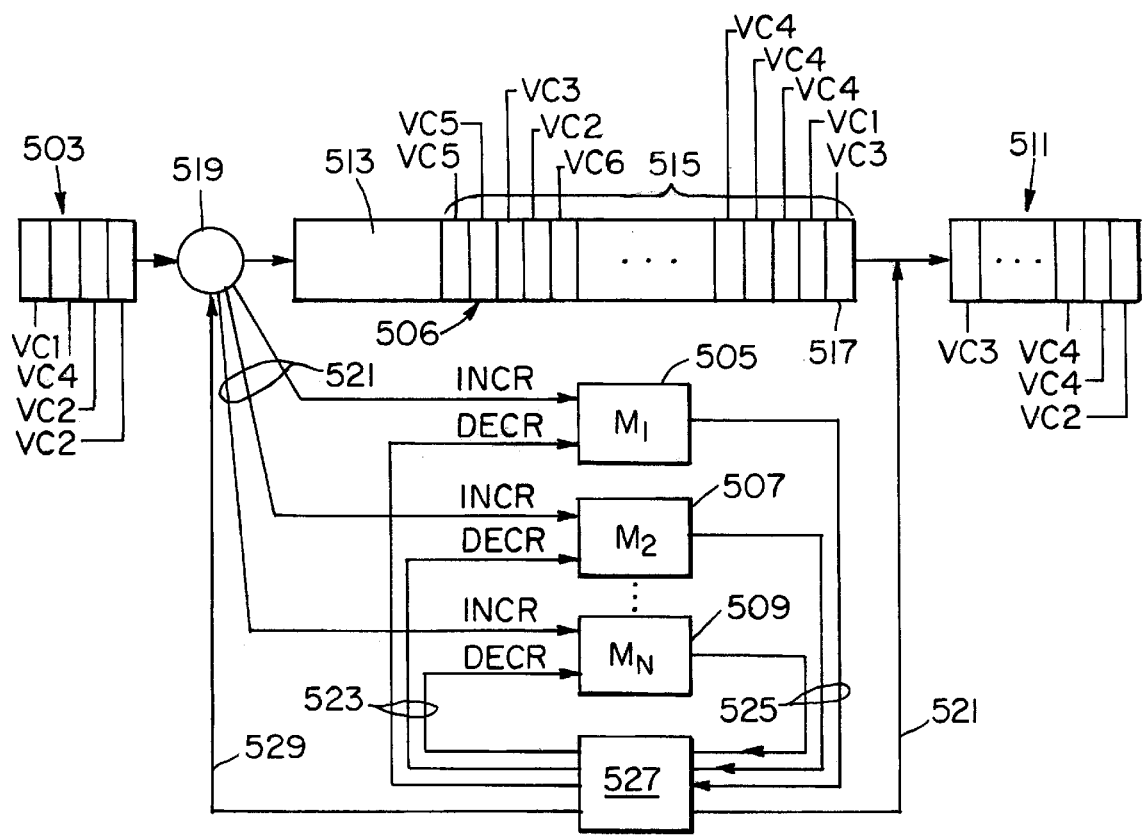
FIG. 5 is a block diagram of a virtual queuing embodiment of the present invention.

FIG. 5 is a block diagram of a virtual queuing embodiment 501 of the present invention. A single first-in first-out (FIFO) buffer 506 is shared by all of the VCs. As with per-VC queuing, a portion 515 of the buffer holds cells 517 which have previously arrived but have not yet been served, and the remaining portion 513 is allocated to incoming cells 503. Note, however, that unlike per-VC queuing, in the shared FIFO system, cells belonging to different VCs are intermixed in one queue so that it is not possible to serve the cells according to a round-robin algorithm.

However, virtual queuing emulates the round-robin excess buffer allocation provided by per-VC queuing on a shared FIFO queue. More specifically, a separate "virtual" queue is implemented by maintaining a cell count $M_j$ 505, 507, 509 for each $VC_j$. Whenever a cell of $VC_j$ is admitted to the FIFO queue, gate 519 sends a signal 521 to the corresponding cell count $M_j$ which is increased by one. During the round-robin scheduling phase, the scheduler 527 serves cells from the FIFO queue 506 via signal 531. As cells are served, the cell counts $M_j$ are decremented by scheduler 527 via signals 523 in a round-robin fashion, regardless of which VC the transmitted cell actually belongs to. Thus, $M_j$ does not correspond to the actual queue occupancy of $VC_j$ in the FIFO queue. Instead, it represents the queue occupancy of $VC_j$ as if per-VC queuing and round-robin output scheduling were implemented.

Algorithm 1' shows the algorithm for applying the virtual queuing technique to emulate the per-VC MCR scheduling of Algorithm 1.

Algorithm 1':
    For j=1, 2, . . . , N
        $W_j = W_j + (MCR_j \times T)$
    While $W_i \geq 1$ for some VC
        Serve a cell from the FIFO queue
        if {L} is not empty
        let i denote the first connection identifier in {L}
        $M_i = M_i - 1$
        $W_i = W_i - 1$
        if $W_i < 1$
            remove i from {L}
        if $M_i > -w$
            append i to the tail of {L}
    If $W_i < 1$ for all VCs
        End of MCR Scheduling During the MCR scheduling phase, cell counts $M_i$ are decremented by one each time a cell is served, or transmitted, as if cells were being served from $VC_1$, then $VC_2$, and so on. Since up to $W_i$ cells could be served in the per-VC embodiment, $M_i$ may be decremented up to $W_i$ times.

A lower bound −w (a negative value) is imposed on $M_i$. If $M_i$ were unbounded and were to become very negative, a large burst of incoming packets of $VC_i$ could be accepted, resulting in buffer overflow. A VC identifier is added to list {L} when a cell arrives for virtual connection $VC_i$ and the corresponding $M_i$ is at the lower bound −w.

As in the case of using per-VC queuing, the traffic can be more evenly distributed as shown in Algorithm 2' below, which corresponds to Algorithm 2 for "smooth" MCR scheduling based on per-VC queuing.

Algorithm 2'
    For j=1, 2, . . . , N
        $W_j = W_j + (MCR_j \times T)$
    While $W_i \geq 1$ for some VC
        Serve a cell from the FIFO queue
        if {L} is not empty
        let i denote the first connection identifier in {L}
        $M_j = M_j - 1$
        $W_j = W_j - 1$
        if $M_j > -w$ AND $W_j > 1$
        append i to the tail of {L}
    If $W_i < 1$ for all VCs
        End of MCR Scheduling It remains to be shown how the excess bandwidth is shared equally among the VCs. Algorithm 3 below shows the round-robin service emulated by virtual queuing.

Algorithm 3 (Round Robin Scheduling Phase):
    When a cell of the FIFO queue is transmitted
        if {L} is not empty
            let i denote the first connection identifier in {L}
            remove i from {L}
            $M_j = M_j - 1$
            if $M_j > -w$
                append i to the tail of {L}

By using virtual occupancy, e.g. the connection cell counts $M_j$, rather than actual occupancy of each connection within the FIFO queue, fair access is achieved, despite the burstiness of the cells. That is, if one connection is particularly active while others are not, the active connection is allowed to utilize a larger portion of the queue.

Finally, in a preferred embodiment, the EPD mechanism is applied to the incoming packets as in the case with per-VC queuing, except that the virtual queue count $M_j$ is used instead of the actual queue length $Q_j$ for each VC.

A simple way to implement the EPD mechanism in a shared FIFO queue is to set a threshold value (EPD threshold). An incoming packet is dropped whenever the queue length exceeds the preset threshold value. To be more specific, the first cell of an incoming packet is discarded if the total queue length at an ATM switch exceeds the EPD threshold. Once the first cell of a packet is discarded, the remaining cells of this packet are also discarded, even when the queue length falls below the EPD threshold. However, a cell is not discarded if the first cell of the same packet has already been accepted into the queue, so that packet integrity is preserved. Thus, with EPD, the switch delivers either all or none of the cells of an incoming packet, to ensure that no bandwidth is wasted in delivering corrupted partial packets. Hence, UBR with EPD achieves higher bandwidth utilization than plain UBR service. The EPD threshold is chosen so that the excess buffer, i.e., the difference between total buffer size and EPD threshold, is large enough to ensure a low rate of buffer overflow.

A drawback of the above EPD/shared FIFO queue scheme is that it cannot achieve fair bandwidth allocation among competing VCs. For example, EPD tends to allocate less bandwidth for VCs traversing multiple congested nodes.

The following pseudocode describes the cell discarding policy of a preferred embodiment, implemented by the packet-level discarding policer 203 of FIG. 2 at the input port of a switch 200 when virtual queuing is implemented. {L} is a list of active VC identifiers. The variable Q denotes the total queue length, or occupancy, of the FIFO queue.
Algorithm 4:

When an incoming cell in $VC_i$ reaches a switch:
  if the cell is the first cell of a packet
    $Th_i = Th_N$
    if $Q \geq Th$ and $M_i \geq Th_i$
      discard this cell
    else
      accept this cell into the FIFO queue
      $M_i = M_i + 1$
      if $M_i = -w + 1$
        append i to the tail of {L}
  else
    if any cell of the packet has been discarded
      discard this cell
    else
      accept this cell into the FIFO queue
      $M_i = M_i + 1$
      if $M_i = -w + 1$
        append i to the tail of {L}

Again, scheduler 527 reads the $M_i$ values 525 and decides which VCs should be blocked. It provides the corresponding information 529 to gate 519 so that gate 519 effectively discards cells corresponding to blocked connections.

Thus, when a cell is accepted in to the FIFO queue, the corresponding cell count $M_i$ is incremented. If $M_i = -w + 1$ immediately after incrementing $M_i$, then this is the first cell in the $VC_i$'s virtual queue, and the connection identifier i is appended to the list L of active connections. Note that acceptance of a first packet cell for connection $VC_i$ into the queue is conditioned on overall queue occupancy Q being greater than threshold Th, and virtual queue occupancy $M_i$ being greater than threshold $Th_i$.

A packet is discarded if any other cell belonging to the packet has already been discarded.

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. In a cell switching network, a method of buffering cells in a switch comprising:
   assigning guaranteed buffer space to individual virtual connections, the buffer space being guaranteed for each of successive intervals;
   over each of said successive intervals, allocating buffer space to individual virtual connections up to the guaranteed buffer space;
   within said intervals, allocating excess buffer space to individual virtual connections.

2. A method as claimed in claim 1 wherein cells are stored in at least one first-in-first-out (FIFO) buffer serving plural virtual connections.

3. A method as claimed in claim 2 wherein buffer space is allocated by:
   for each incoming cell stored in the FIFO buffer, identifying a virtual connection and incrementing a cell count for that virtual connection;
   decrementing virtual connection cell counts with outgoing cells independent of the actual virtual connection with which each outgoing cell is associated, individual virtual connection cell counts being decrementable to negative values; and
   blocking from storage in the buffer incoming cells associated with a virtual connection having a cell count above a connection threshold.

4. The method of claim 3 wherein the cell counts have associated negative limits beyond which the cell counts are not decremented.

5. A method as claimed in claim 4 further comprising decrementing each virtual connection cell count in each period of time first by an amount weighted to the associated guaranteed buffer space of the virtual connection and then in accordance with a fairness algorithm.

6. A method as claimed in claim 5 wherein the fairness algorithm decrements virtual connection cell counts on a round robin basis.

7. A method as claimed in claim 6 wherein incoming cells are only blocked from storage when the buffer is filled to a fill threshold.

8. A method as claimed in claim 1 wherein the cells are buffered in queues associated with respective virtual connections.

9. The method of claim 8 wherein there is one queue per virtual connection and buffer space is allocated by transferring data from a queue in order to free buffer space in the queue.

10. A method as claimed in claim 9 wherein incoming cells are only blocked from storage when a queue is filled to a fill threshold.

11. A method as claimed in claim 1 wherein incoming cells are only blocked from storage when a buffer is filled to a fill threshold.

12. A method as claimed in claim 1, wherein the excess buffer space is served through a fairness algorithm.

13. The method as claimed in claim 12, wherein the excess buffer space is served through a weighted fairness algorithm in which different weights are assigned to different virtual connections.

14. In a cell switching network, a method of buffering cells in a switch comprising:
   storing cells from an incoming line in a buffer and outputting the cells onto an outgoing line on a first-in-first-out basis;
   for each incoming cell, identifying a virtual connection and incrementing a cell count for that virtual connection;
   decrementing virtual connection cell counts with outgoing cells independent of the actual virtual connection with which each outgoing cell is associated, individual virtual connection cell counts being decrementable to negative values; and
   blocking from storage in the buffer incoming cells associated with a virtual connection having a cell count above a connection threshold.

15. The method of claim 14 wherein the cell counts have associated negative limits beyond which the cell counts are not decremented.

16. A method as claimed in claim 15 wherein incoming cells are only blocked from storage when the buffer is filled to a fill threshold.

17. In a cell switching network, a method of buffering cells in a switch comprising:
   storing cells from an incoming line in a buffer and outputting the cells onto an outgoing line on a first-in-first-out basis;
   for each incoming cell, identifying a virtual connection and incrementing a cell count for that virtual connection;
   decrementing virtual connection cell counts with outgoing cells independent of the actual virtual connection associated with each outgoing cell in accordance with an algorithm which decrements higher priority virtual connections at a higher rate; and
   blocking from storage in the buffer incoming cells associated with a virtual connection having a cell count above a connection threshold.

18. A method as claimed in claim 17 where the virtual connection cell counts are decremented in accordance with a guaranteed buffer space.

19. A method as claimed in claim 18 wherein incoming cells are only blocked from storage when the buffer is filled to a fill threshold.

20. In a cell switching network, a switch comprising:
   a buffer from which guaranteed buffer space is assigned to individual virtual connections, the buffer space being guaranteed for each of successive intervals, such that over each of said successive intervals, available buffer space is allocated to individual virtual connections up to the guaranteed buffer space, and
   within said intervals, excess buffer space is allocated to individual virtual connections.

21. The switch as claimed in claim 20 wherein the buffer comprises at least one first-in-first-out (FIFO) buffer for serving plural virtual connections.

22. The switch as claimed in claim 21 further comprising plural cell counts, each cell count being associated with a virtual connection, such that:
   a cell count associated with a virtual connection is incremented, the virtual connection being identified with an incoming cell stored in the FIFO buffer;
   a cell count is decremented when a cell is served from the FIFO buffer, independent of the actual virtual connection with which the outgoing cell is associated, a cell count being decrementable to negative values; and
   incoming cells associated with a virtual connection having a cell count above a connection threshold are blocked from storage in the buffer.

23. The switch of claim 22 wherein the cell counts have associated negative limits beyond which the cell counts are not decremented.

24. The switch as claimed in claim 23 wherein each virtual connection cell count is decremented in each period of time first by an amount weighted to the associated guaranteed buffer space of the virtual connection and then in accordance with a fairness algorithm.

25. The switch as claimed in claim 24 wherein the fairness algorithm decrements virtual connection cell counts on a round robin basis.

26. The switch as claimed in claim 25 wherein incoming cells are only blocked from storage when the buffer is filled to a fill threshold.

27. The switch as claimed in claim 20 wherein the buffer comprises queues associated with respective virtual connections, wherein incoming cells identified with a virtual connection are stored in a queue associated with the virtual connection.

28. The switch as claimed in claim 27 further comprising one queue per virtual connection such that buffer space is allocated by transferring data from a queue in order to free buffer space in the queue.

29. The switch as claimed in claim 28 wherein incoming cells are only blocked from storage when a queue is filled to a fill threshold.

30. The switch as claimed in claim 20 wherein incoming cells are only blocked from storage when a buffer is filled to a fill threshold.

31. The switch as claimed in claim 20, wherein the excess buffer space is allocated through a fairness algorithm.

32. The switch as claimed in claim 31, wherein the excess buffer space is served through a weighted fairness algorithm in which different weights are assigned to different virtual connections.

33. In a cell switching network, a switch comprising:
   a first-in-first-out (FIFO) buffer which stores cells from an incoming line and from which the cells are output onto an outgoing line on a first-in-first-out basis; and
   plural cell counts, each cell count being associated with a virtual connection, such that
   a cell count associated with a virtual connection is incremented, the virtual connection being identified with an incoming cell stored in the FIFO buffer,
   a cell count is decremented when a cell is served from the FIFO buffer, independent of the actual virtual connection with which the outgoing cell is associated, a cell count being decrementable to negative values, and
   incoming cells associated with a virtual connection having a cell count above a connection threshold are blocked from storage in the buffer.

34. The switch as claimed in claim 33 wherein the cell counts have associated negative limits beyond which the cell counts are not decremented.

35. The switch as claimed in claim 34 wherein incoming cells are only blocked from storage when the buffer is filled to a fill threshold.

36. In a cell switching network, a switch comprising:
   a first-in-first-out (FIFO) buffer which stores cells from an incoming line and from which the cells are output onto an outgoing line on a first-in-first-out basis; and
   plural cell counts, each cell count being associated with a virtual connection, such that
   a cell count associated with a virtual connection is incremented, the virtual connection being identified with an incoming cell stored in the FIFO buffer,
   a cell count is decremented when a cell is served from the FIFO buffer, independent of the actual virtual connection with which the outgoing cell is associated in accordance with an algorithm which decrements higher priority virtual connections at a higher rate, and
   incoming cells associated with a virtual connection having a cell count above a connection threshold are blocked from storage in the buffer.

37. The switch as claimed in claim 36 wherein the virtual connection cell counts are decremented in accordance with a guaranteed buffer space.

38. The switch as claimed in claim 37 wherein incoming cells are only blocked from storage when the buffer is filled to a fill threshold.

* * * * *